United States Patent [19]

Cutler et al.

[11] 4,237,531

[45] Dec. 2, 1980

[54] CONTROLLED CURRENT INVERTER SYSTEM HAVING SEMICONDUCTOR OVERVOLTAGE PROTECTION

[75] Inventors: John H. Cutler, Roanoke; Loren H. Walker, Salem, both of Va.

[73] Assignee: General Electric Company, Salem, Va.

[21] Appl. No.: 32,770

[22] Filed: Apr. 24, 1979

[51] Int. Cl.³ .................... H02H 7/122; H02P 5/40
[52] U.S. Cl. .................................. 363/58; 363/37; 318/798; 318/805
[58] Field of Search .................. 363/34, 37, 50–58, 363/135–138; 361/33, 79, 86, 88, 91; 318/798, 802–803, 805

[56] References Cited

U.S. PATENT DOCUMENTS

| | | | |
|---|---|---|---|
| 3,719,873 | 3/1973 | Graf | 318/798 |
| 3,887,860 | 6/1975 | Bernhardt et al. | 363/57 |
| 3,909,687 | 9/1975 | Abbondanti | 318/805 |
| 4,106,069 | 8/1978 | Trautner et al. | 361/79 X |
| 4,139,885 | 2/1979 | Overzet et al. | 363/58 |
| 4,188,663 | 2/1980 | Okawa et al. | 363/37 X |

*Primary Examiner*—William M. Shoop
*Assistant Examiner*—Peter S. Wong
*Attorney, Agent, or Firm*—Arnold E. Renner

[57] ABSTRACT

A controlled current inverter system including an inverter circuit having controlled rectifiers for supplying an output of variable voltage and frequency for application to a load; e.g., an electric motor, further includes a variable direct current power source for supplying electrical power to the inverter circuit. Protection against overvoltage conditions of the inverter circuit rectifiers is provided as a function of the inverter output voltage, current and the electrical characteristics of a load supplied by the inverter circuit. This protection takes the form of circuitry which anticipates a potential overvoltage condition and acts to reduce the output of the direct current power source and inhibit the firing of the rectifiers of the inverter circuit until such time as the potential overvoltage condition is eliminated.

11 Claims, 6 Drawing Figures

CONTROLLED CURRENT INVERTER SYSTEM HAVING SEMICONDUCTOR OVERVOLTAGE PROTECTION

BACKGROUND OF THE INVENTION

The present invention relates generally to controlled current inverter systems of the type employing controlled rectifiers and utilizing an inverter circuit to supply variable voltage and frequency alternating current to a load such as an electric motor and more particularly to such systems which include means for the protection of the rectifiers of the inverter circuit from overvoltage conditions.

The controlled current inverter system is one which is now, in its basic form, becoming increasingly popular as a supply of variable voltage, current and frequency for loads such as an alternating current (a.c.) motor. In its most popular form, the system includes a source of variable direct current (d.c.) power, an inverter circuit comprised of six controlled rectifiers, for example, thyristors of the type more properly known as silicon controlled rectifiers or SCRs, and a d.c. link connecting the d.c. power source and the inverter circuit which link includes a reactor. The output of the inverter circuit is used to supply a load which, as earlier indicated, if often an a.c. motor. The output current of the system, as applied to the load, is varied by varying the output voltage of the d.c. source. The frequency is varied by controlling the controlled rectifiers of the inverter bridge. That is, by varying the rate of application of gating signals to the thyristors of the inverter circuit the output frequency is varied.

The typical controlled current inverter circuit is a symmetrical arrangement which, in the three phase embodiment, includes a bridge arrangement of three legs each consisting of a series arrangement of a controlled rectifier, a diode, a second diode, and a second controlled rectifier. The junction of the two diodes in each leg forms the output point of one phase. The three legs of the inverter circuit are connected between the positive and negative buses which connect these legs to the d.c. source. The three controlled rectifiers connected to the positive bus are normally considered as one-half of the circuit while those connected to the negative bus are considered to be the other half of the circuit. Typically, these are referred to as the positive and negative groups of the bridge. There is further included, in the customary inverting circuit, a plurality of commutating capacitors which are connected between each of the legs; that is, there is a commutating capacitor connected between each pair of controlled rectifiers in both the positive and negative groups of this circuit such that six commutating capacitors are used.

As earlier expressed, one of the most common applications of the controlled current inverter is for the control of operation of an a.c. motor, particularly an a.c. induction motor. It is well known that an a.c. induction motor represents an inductive electrical load in which the power factor varies as a function of the load on the motor. Hence, the phase angle between the motor current and motor voltage, and thus the current and voltage as seen at the output of the bridge and within the bridge, will vary. Thus, at no load the motor will appear as an almost pure inductance and the current will lag the voltage by almost 90°; whereas, if the motor is loaded in either a motor operation or a regeneration operation the angle will move away from the 90° point.

It is further well known that semiconductor devices, especially those of the thyristor class (e.g., silicon controlled rectifiers—SCRs), are susceptable to damage by excessive voltages, even though these voltages may be of a highly transient nature. It is also well known, that the commutating capacitors utilized in controlled current inverters tend to introduce transient voltages ("spikes") which at heavy load currents can be of a fairly high magnitude. These spikes must be considered in that they add to the fundamental applied voltage. The value or magnitude of these spikes will be a function of both the load and the load current.

Past practice has been to determine the maximum possible value of the sum of peak motor voltage and the magnitude of the spikes and to use this value in the determination of the rating of the semiconductors to be used within the system. The end result of this past practice has been to require the use of semiconductor devices which have a rating far in excess of that required to properly handle the fundamental voltage which occurs across the inverter circuit. This results in a far more expensive apparatus than if only steady state handling capabilities are required.

In addition to the rating problem just mentioned, most prior art systems employed some form of protection scheme to guard against semiconductor device damage. The usual method employed was to sense the total inverter circuit current and to shut the inverter circuit down by withholding gating signals to the controlled rectifiers when the current reached some predetermined value indicative of a potential failure condition. Manual restarting was then required to place the system back into operation. This shutting down and restarting is obviously undesirable for most, if not all, applications and further led to the use of wider margins between the rated and permissible steady state capabilities of the inverter circuit.

SUMMARY OF THE INVENTION

It is, therefore, an object of the present invention to provide an improved controlled current inverter system.

It is a further object to provide a controlled current inverter system which anticipates potential transient overvoltage conditions and takes protective action with respect thereto.

A still further object is to provide a controlled current inverter system which protects against overvoltage conditions as a function of the load voltage, the load current and the electrical parameters of the load.

It is another object to provide a controlled current inverter system having an inverter circuit employing semiconductor controlled rectifiers in which there is further provided means to anticipate a potential overvoltage condition with respect to the controlled rectifiers and take protective action with respect thereto.

The foregoing and other objects are achieved, in accordance with the present invention, by providing a controlled current inverter system, employing an inverter circuit having controlled semiconductor devices, which controls the output voltage, current and frequency of electrical power supplied to a load. The system further includes means for protecting the semiconductor devices of the inverter circuit against impressed voltages in excess of a prescribed magnitude. This protection system employs means to determine the magnitude of the output voltage of the inverter system and to provide a first signal proportional thereto. There is further included means to determine the magnitude of the output current of the inverter circuit and to provide a second signal having a value proportional to this current. Additional means adjusts the value of the second signal by a constant which is determined as a function of the impedance values of the load supplied by the inverter circuit. This adjusted value or third signal is combined with the first signal to provide a limit signal which is compared with a reference signal proportional to the maximum permissible voltage which is to be permitted across the semiconductor devices. In the most fundamental form of the present invention, the limit signal is compared with the reference signal to provide an output or a correction signal in response to a prescribed relationship between the two signals. This correction signal is used to effect a reduction in the output current of the inverter circuit, preferably by causing a reduction in the current supplied to the inverter circuit from the d.c. source. Also, in the preferred embodiment, the correction signal is further utilized to temporarily inhibit the gating on of the rectifiers of the inverter circuit, until the load current is reduced, to prevent the imposition of excess voltages across the rectifiers as a result of commutation.

BRIEF DESCRIPTION OF THE DRAWING

While the present invention is described in particularity in the claims annexed to and forming a part of this specification, a better understanding of the invention can be had by reference to the following description taken in conjunction with the accompanying drawings in which:

DETAILED DESCRIPTION

Figure 1:
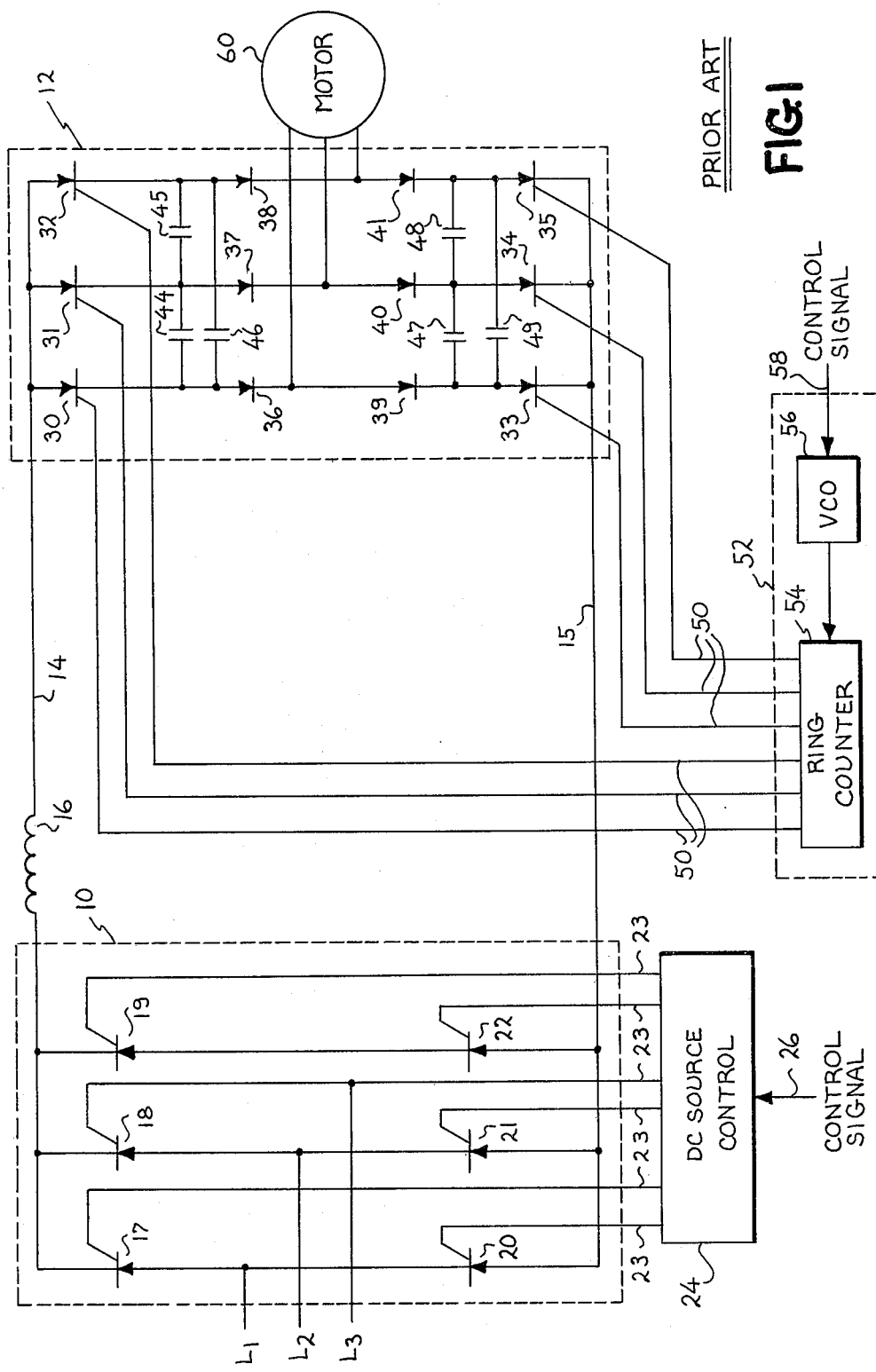
FIG. 1 is a schematic diagram of a basic controlled current inverter system such as is utilized in the prior art and in the implementation of the present invention.

FIG. 1 shows a basic controlled current inverter system such as is common in the prior art and which, as will be more fully appreciated as this description proceeds, is employed in the overall system of the present invention. The controlled current inverter system as shown in FIG. 1 includes a variable direct current (d.c.) source 10 of any known type capable of providing a variable d.c. output voltage in accordance with an input control signal. In its preferred embodiment, however, and as is illustrated in FIG. 1, the source 10 is comprised of a three phase bridge consisting of six thyristors 17 through 22 which receives alternating current (a.c.) power from a suitable three phase source represented by the lines $L_1$, $L_2$ and $L_3$. (For sake of convenience, the term thyristor will be used in the remaining portion of this description and it is to be expressly understood that the term is used in a generic sense to connote controlled rectifiers generally.) As is known in the art, the output of the source 10 can be made a function of the time during which the thyristors 17 through 22 of the bridge arrangement are gated on with respect to the applied voltage. This is commonly known as phase controlling. The control of the thyristors 17 through 22 is a function, inter alia, of gating signals applied to gate electrodes thereof by way of lines 23 which are supplied from a suitable d.c. source control 24. Control 24 provides output signals as a function of a control signal applied by the way of a line 26 thereto. It is, of course, recognized that other forms of a variable voltage d.c. source can be used with equal facility insofar as the present invention is concerned.

The variable d.c. source 10 supplies a d.c. voltage to an inverter circuit 12 by way of a d.c. link comprised of suitable conductors 14 and 15 and further including a reactor 16. The inverter circuit is comprised of, in the three phase embodiment illustrated, six thyristors 30 through 35 which form a basic bridge arrangement. Thyristors 30, 31 and 32 form the basic part of what is customarily considered to be the positive half of the bridge while thyristors 33, 34 and 35 form the basic portion of the negative side of the inverter bridge. The bridge illustrated has three legs with the first leg including thyristors 30 and 33 and further including a pair of series connected diodes 36 and 39. In a like manner, the second leg includes thyristors 31 and 34 and a pair of series connected diodes 37 and 40 while the third leg includes thyristors 32 and 35 and series connected diodes 38 and 41. Commutating capacitors are associated; i.e., connected, between each pair of diodes. That is, a first commutating capacitor 44 is connected between the cathodes of thyristors 30 and 31 while a capacitor 45 is connected between the cathodes of thyristors 31 and 32. The third commutating capacitor in the positive portion of the inverter circuit is connected between the cathodes of thyristors 30 and 32. In a similar manner, commutating capacitors 47, 48 and 49 are connected between respective pairs of the anodes of thyristors 33, 34 and 35. The gating on (rendering conductive) of the thyristors 30 thru 35 of inverter circuit 12 is a function of gating signals applied to the gate electrodes thereof by way of suitable leads 50 which carry signals derived from a suitable inverter control 52. The exact nature of the gating inverter control 52 is not of prime importance to the present invention but, in a typical system, may include a ring counter 54 which is supplied with pulses from a suitable source such as a voltage controlled oscillator 56 which receives an input control signal by way of a line 58 as shown in FIG. 1. The output of the inverter is taken from the junction points of each of the diode pairs 36-39, 37-40, 38-41 and is applied to a suitable load which in FIG. 1 is shown as a motor 60.

Figure 2:
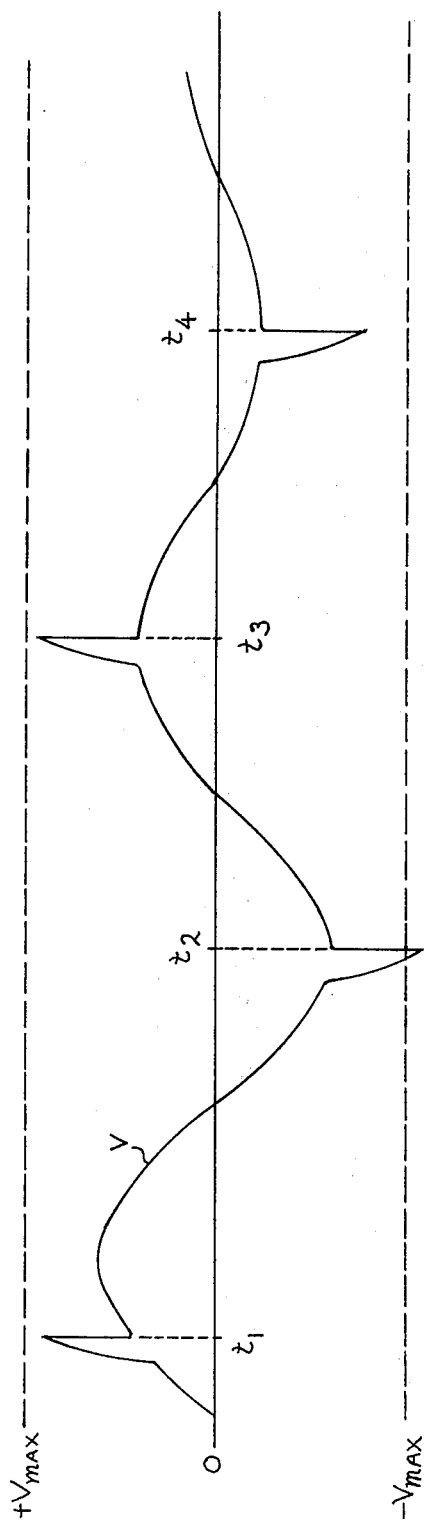
FIG. 2 is a graph, plotting semiconductor voltage as a function of time, illustrating the problem prevelant in the type of systems to which the present invention is applicable.

FIG. 2 illustrates the problem associated with controlled current inverter system which the present invention corrects. In FIG. 2, there is plotted, as a function of time, a fundamental sine wave voltage of decreasing magnitude such as might result from a decreasing voltage output at the inverter circuit 12. Further shown in FIG. 2 are the predominate transient voltage spikes which appear at various times $t_1$, $t_2$, $t_3$ and $t_4$. These spikes are a normal part of the operation of this type of inverter. Their amplitude is proportional to the operating current level. Their position on the fundamental voltage wave is determined by the motor power factor angle. The final depiction of FIG. 2 concerns lines $+V_{max}$ and $-V_{max}$ which represent, respectively, the maximum voltages which are permitted across the thyristors (or diodes) of the inverter bridge. It is seen from FIG. 2, at time $t_1$, that if a spike of a given magnitude were to occur at a time when the voltage wave V is less than its maximum fundamental value, the total voltage appearing across the thyristor would not exceed the maximum permissible value. On the other hand, as shown at time $t_2$, if a transient spike of the same magnitude were to occur at the peak of the fundamental voltage there would exist across the rectifier a voltage which is in excess of that permissible. This could easily result in damage to the rectifier. (It is noted that at times $t_1$ and $t_2$ the magnitude of the fundamental wave V has remained constant.) The further depiction of FIG. 2 shows (times $t_3$ and $t_4$) that when the fundamental voltage V decreases, larger transient spikes may occur without exceeding the maximum permissible voltage across any of the rectifiers. This is of importance since in many load situations, particularly those when a motor is involved, the current may be much higher at the time of starting or low speed than during higher speed steady-state operation. The fundamental voltage will, however, be lower during starting. Since the value of the transient spike is dependent upon the value of the current, it is seen that the system tends to be self-compensating to a degree.

Figure 3:
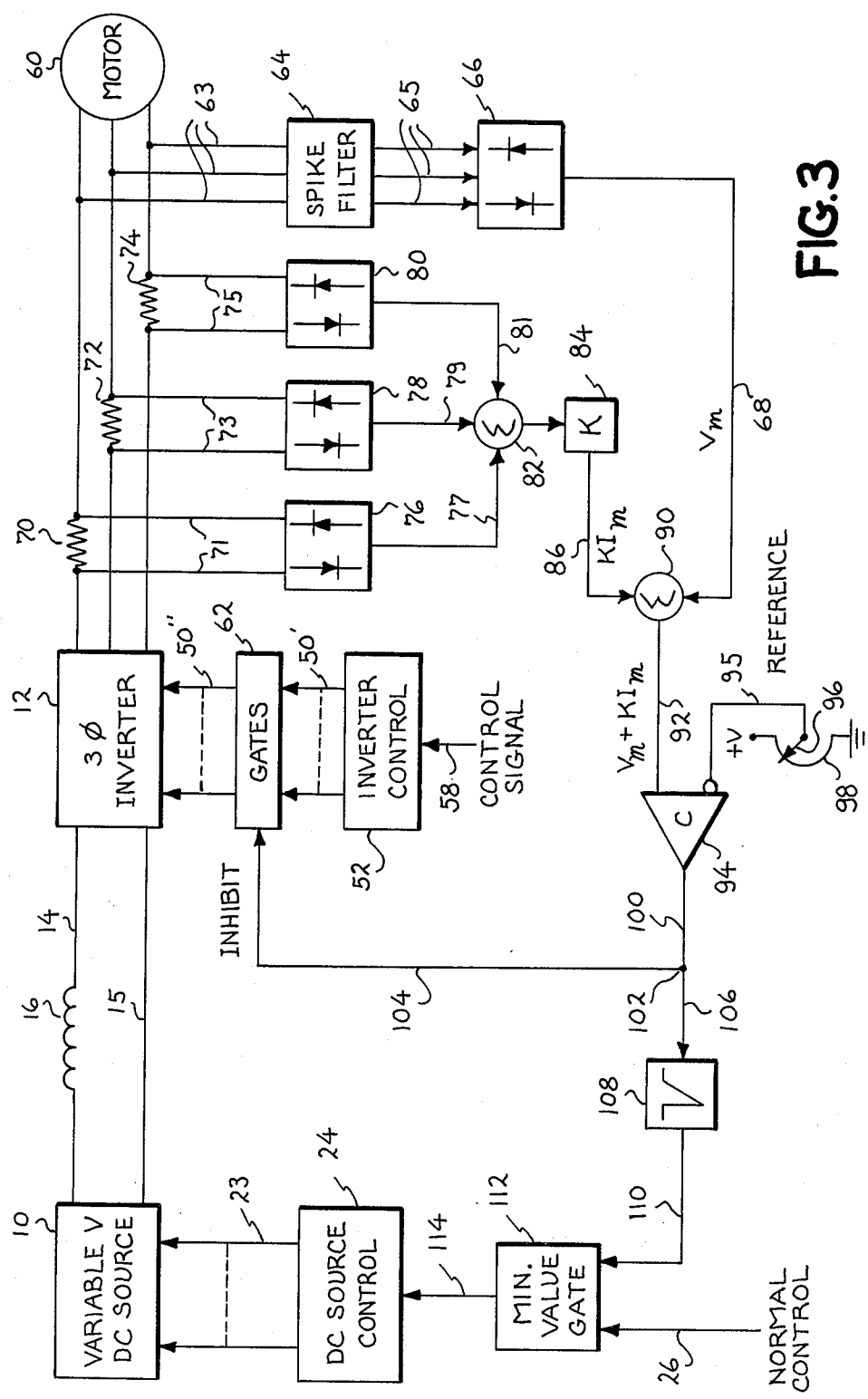
FIG. 3 is a schematic diagram partially in block form illustrating the present invention in its preferred embodiment; and, FIG. 4 is a possible modification to a portion of the circuit of FIG. 3.

FIG. 3 illustrates the present invention in its preferred embodiment. Insofar as practical in FIG. 3, the same characters have been assigned to like elements as were assigned in FIG. 1. Referencing now FIG. 3, it is seen that there is once more shown a variable voltage d.c. source 10 which is connected to a three-phase inverter 12 by way of a d.c. link having conductors 14, 15 and further including inductor 16. The output of the inverter 12 supplies a load which is once more shown as a motor 60. As before, the variable control source 10 is controlled via leads 23 by way of a d.c. source control 24. Also, similarly to FIG. 1, the inverter 12 is under the control of an inverter control 52 having a control signal applied thereto by way of control lead 58. A distinction does exist here, about which more will be later said, in that interposed within the gate leads 50 between the inverter control 52 and the inverter 12 is an additional element labeled gates 62.

The gates 62 and the remaining depiction of FIG. 3 constitute the essence of the present invention. A first feedback signal developed by the system of the present invention is a signal proportional to the output voltage of the inverter. To this end there is provided a full wave rectifier 66 which receives, via lines 65, the output of a spike filter 64 which is connected across the three input leads to the load 60 (the output leads of the inverter 12). This is a well-known form of feedback control signal and provides on line 68, the output of the full wave rectifier 66, a signal $V_m$ which is proportional to the output voltage of the inverter (the input voltage to the motor). The spike filter 64 merely serves to remove any spikes or transients from the voltages applied to the motor so that the output of the rectifier is a more accurate representation of the true value of the fundamental voltage supplied to the load.

The second feedback signal developed within the system is one which is proportional to the load current. To this end, there are provided three low resistance shunts 70, 72 and 74 one of which is disposed in each of the supply lines from the inverter to the motor 60. By way, respectively, of lines 71, 73 and 75 the voltage developed across the three shunts 70, 72 and 74 is applied, respectively, to three full wave rectifiers 76, 78 and 80 so that there appears on the respective rectifier output lines 77, 79 and 81 three voltage signals which are proportional to the current $I_m$ being supplied to the load. This is a common and a well-known method of providing a current feedback signal.

The signals on the three lines 77, 79 and 81 are all applied to a suitable summing junction 82 (e.g., an operational amplifier connected in the summing mode) and the output of the summing junction, a voltage value proportional to the total load current, is supplied to a suitable amplifier 84 which has a gain of K. (It is noted that a signal almost identical to the one at the output of summing junction 82 could have been obtained by sensing the current in either lead 14 or 15 directly. This could be achieved by placing a low resistance shunt in either of the lines 14 or 15 such that there is developed across that shunt a voltage signal which is proportional to the current in the line. This signal, properly scaled and isolated; e.g., by any appropriate state of the art d.c. isolator circuit, would, in this embodiment, serve as a substitute for the signal eminating from summing junction 82 and would serve as the input to amplifier 84.) The output of the amplifier 84 which appears on line 86 will, therefore, have a value of $KI_m$. K is a constant which is derived from the actual motor characteristics. For any given motor, the value of the transient spikes, discussed with respect to FIG. 2, will have a magnitude which is a function of the motor current, the motor inductance and the inverter capacitance. While the actual derivation of the value of K can be quite complex, a value sufficiently accurate for most industrial purposes can be derived from the formula: $K = \sqrt{L/C}$, wherein L is the effective inductance of the load. In the case of a motor load, the effective inductance will be the line-to-line leakage inductance. C is the equivalent commutating capacitance of the inverter.

The two signals on lines 68 and 86, the $V_m$ signal and the $KI_m$ signal, are applied to a suitable summing junction 90 to provide an output signal on line 92 which has a value equal to the sum of the two inputs; i.e., $V_m + KI_m$. The signal on line 92 will have an instantaneous value which is equal to the sum of the fundamental voltage plus the spike voltage, as was illustrated in FIG. 2. The signal on line 92 forms one input to a comparator 94 the other input to which is a reference signal on line 95. This reference signal is set to be proportional to the maximum voltage permitted across any of the rectifiers of the inverter bridge. The exact manner in which this reference signal is achieved is not important to the present invention but for purposes of illustration it is shown as being derived from the wiper arm 96 of a suitable potentiometer 98 connected between a source of voltage $+V$ and ground. In its simplest implementation, the potentiometer would be operator settable for the voltage rating of the particular thyristors utilized in the system.

From the foregoing discussion, it is understood that the output of the comparator 94, which appears on line 100, is a signal which, by the proper selection of components and polarities, will be a positive signal indicating that there is an overvoltage condition either existing or imminent. That is, the value of the $V_m + KI_m$ signal on line 92 is in excess of the reference value on line 95. This output of comparator 94 appearing at a junction 102 serves two purposes in the present invention. This output is first applied by way of line 104, as an inhibit signal to the gates 62 earlier mentioned. The gates 62 may be nothing more than a plurality of NAND gates (or AND gates) such that when the signal on line 104 is of an appropriate level, the gates 62 are inhibited and thus prevent the passage of gating signals on lines 50' and 50" from the inverter control 52 to the inverter 12. Thus, the first action occurring when the output of comparator 94 indicates a potentially dangerous condition is to halt the firing of the thyristors of the inverter 12.

The output comparator 94, by way of junction 102 and line 106, also serves as the input to a suitable function generator 108 which, in FIG. 3 embodiment, provides what amounts to a negative saw-tooth wave. That is, in response to the input on line 106, the output of the generator 108 will drop suddenly from its quiescent value and then begin to slowly ramp back to its quiescent value. This signal is applied by way of a lead 110 to a minimum value gate 112 to which is also applied the normal control signal (line 26) for the variable voltage d.c. source. The minimum value gate 112 may be of any suitable form such as a pair of parallel connected diodes each receiving a one of the signals on lines 26 and 110 and having their anodes connected by way of a resistor to a positive potential source such that the output of the minimum value gate 112 which appears on line 114 is the more negative or the smaller in value of the two applied input signals. Since the d.c. source control 24 in this embodiment responds to the value of its input on line 114, and in that the control 24 effects a lesser output voltage from the d.c. source 10 in response to a more negative signal, it is seen that by the proper scaling of values on lines 26 and 110, when an output signal from comparator 94 indicates a potentially damaging voltage situation, the minimum value gate 112 will turn control over the signal on line 110 to thus reduce the voltage from the d.c. source 10 allowing system recovery without the necessity of shutting down the system. This, then, is the second action which occurs in the protection of the rectifiers of the inverter 12.

In brief summary of the embodiment just described, it is seen that the control of the present system determines the instantaneous value of the voltage, including transients, which could be applied across the inverter rectifiers and compares that value with a reference signal representing the maximum safe value permissible. When the former exceeds the latter, two actions are taken. The first action is to temporarily inhibit the application of a gating signal to the thyristors which will, of course, prevent the occurrence of further commutation transients or spikes. The second action is to immediately lower the output voltage of the variable d.c. source. With these actions, the value of the $V_m + KI_m$ signal will drop below the value of the reference signal on line 95, the output of comparator 95 will go down and normal system operation will be resumed.

Figure 4:
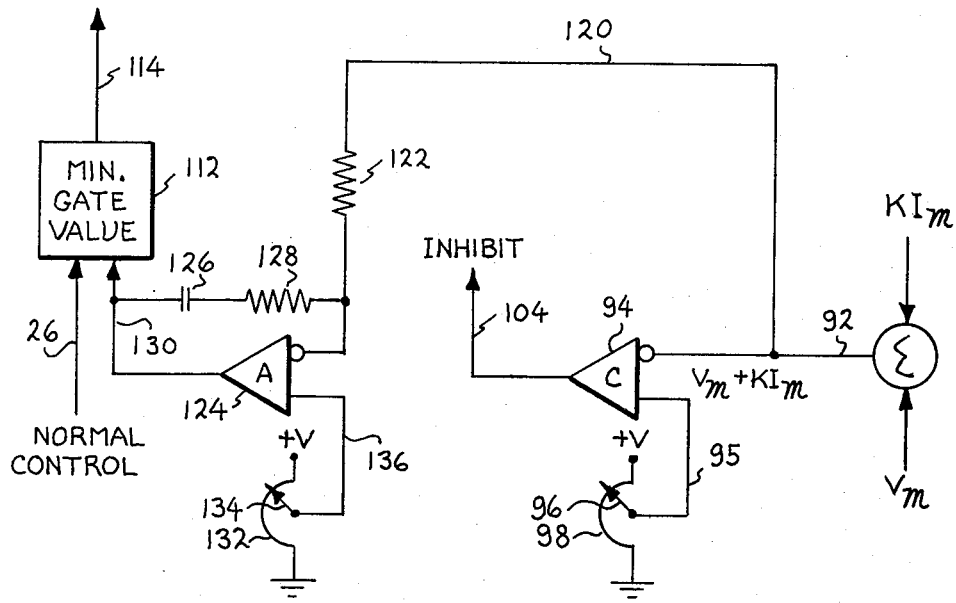

FIG. 4 illustrates one possible modification to the circuit configuration shown in FIG. 3. In this modification, the function generator 108 of FIG. 3 is replaced by a linear amplifier. Referencing now FIG. 4, it is seen that the inhibit signal is produced in the same manner as before; i.e., as the output of the comparator 94. In this situation, however, the error signal applied to the minimum value gate 112 is the output of a linear operational amplifier 124 by way of line 130. Amplifier 124 may be an operational amplifier having a feedback circuit including the series combination a capacitor 126 and a resistor 128 connected between its output and its inverting input. The signal $V_m + KI_m$ (line 92) also forms an input to the inverting input of amplifier 124 via line 120 and an input resistor 122. The noninverting input of amplifier 124 is connected (line 136) to a suitable reference source shown, in FIG. 4, as a potentiometer 132 connected between a source of positive potential (+V) and ground. The actual reference voltage is taken from the wiper arm 134 of potentiometer 132. By making the value of the reference from potentiometer 132 such that amplifier 124 becomes effective before comparator 94 outputs the inhibit signal; i.e., the signal on line 136 is of a lesser value than that on line 95, assuming similar components are used, the output of amplifier 124 acting through the minimum gate value acts as a current regulator to regulate the current in the d.c. link to the maximum value permitted without exceeding the maximum rectifier voltage(s).

Figure 5A:
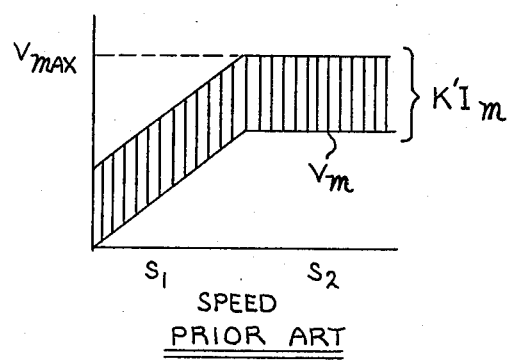
FIGS. 5a and 5b are graphs diagrammatically illustrating the advantages of the present invention.
Figure 5B:
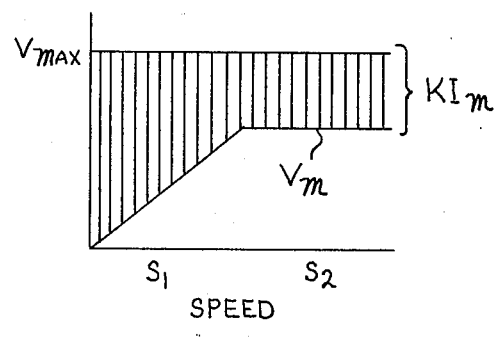

FIGS. 5a and 5b diagrammatically illustrate the advantages of the present invention. The prior art, as illustrated by FIG. 5a, sized components so as not to exceed the maximum permissible voltage ($V_{max}$) at any time. Thus, as illustrated in FIG. 5a, which plots voltage against motor speed, as the motor voltage rises as a function of speed increase, the total allowed voltage was simply the value of the motor voltage plus a constant increment allowed for the transient spikes. This is shown in FIG. 5a by the shaded area $K'I_m$. In the present invention, however, the total voltage is the governing factor at all times. Thus, when the motor speed and hence the motor voltage is low; e.g. at $S_1$, the permissible spike voltage is much higher than when the motor voltage is high; e.g., at $S_2$. This is apparent by the varying value of $KI_m$ (shaded area) in FIG. 5b. Thus, the permitted capability of the output voltage of the inverter of the present invention far exceeds those of the prior art and a much more efficient and less expensive system is provided.

While there has been shown and described what is considered to be the preferred embodiment of the present invention, modifications thereto will readily occur to those skilled in the art. It is not desired, therefore, that the invention be limited to the specific arrangement shown and described and it is intended to cover in the appended claims all such modifications as fall within the true spirit and scope of the invention.

What is claimed is:

1. In a controlled current inverter system including an inverter circuit having controlled semiconductor devices for controlling the output voltage, current and frequency of the inverter circuit, means for protecting the semiconductor devices against impressed voltages in excess of a prescribed magnitude comprising:
    (a) means to determine the magnitude of the output voltage of said inverter circuit and to provide a first signal having a value proportional thereto;
    (b) means to determine the magnitude of the output current of said inverter circuit and to provide a second signal having a value proportional thereto;
    (c) means to adjust the value of said second signal by a constant to provide third signal of adjusted magnitude, said constant having a value determined as a function of the impedance values of a load supplied by said inverter circuit;
    (d) means to combine said first and third signals to provide a limit signal;
    (e) means to provide a reference signal proportional to a permissible voltage which may be impressed across each of said semiconductor devices;
    (f) means to compare said limit signal and said reference signal and to output a correction signal in response to a prescribed relationship therebetween; and, (g) means responsive to said correction signal to effect a reduction in the output voltage and current of said inverter circuit.

2. The invention in accordance with claim 1 wherein said means to adjust the value of said second signal includes an amplifier having a gain of approximately K, wherein:

$$K = \sqrt{L/C}$$

in which,

L is the effective inductance of said load, and

C is the effective commutating capacitance of said inverter.

3. The invention in accordance with claim 1 wherein said means responsive to said correction signal includes means to prevent rendering conductive the controlled devices of said inverter circuit.

4. A controlled current inverter system for supplying a load with variable voltage and frequency electrical power comprising:

(a) a variable direct current voltage source for providing a variable output voltage;

(b) a polyphase inverter circuit connected to said source to receive said output voltage, said inverter circuit including a plurality of controlled rectifiers operable in response to gating signals applied thereto for supplying the load with electrical power;

(c) means to sense the magnitude of the voltage supplied to said load and to provide a first signal having a value proportional thereto;

(d) means to sense the magnitude of the current supplied to said load and to provide a second signal having a magnitude proportional thereto;

(e) means to modify said second signal by a constant to provide a third signal, said constant having a value which is a function of the electrical characteristics of said load;

(f) means to add said first and third signals to develop a correction signal;

(g) means to provide a reference signal having a value proportional to the maximum value of the instantaneous voltage to be permitted across a one of said controlled rectifiers;

(h) means to compare said reference signal and said limit signal and to output a correction signal in response to a prescribed relationship therebetween; and, (i) correction means responsive to said correction signal to reduce the voltage supplied to said inverter by said direct current voltage source and to modify the application of gating signals to the rectifiers of said inverter circuit to thereby prevent an excessive voltage from existing across said rectifiers.

5. The invention in accordance with claim 4 wherein said correction means includes gating means for selectively passing said gating signals to said rectifiers and wherein said correction signal acts as an inhibit signal to prevent said gating means from passing the gating signals to the rectifiers.

6. The invention in accordance with claim 4 wherein the output of said direct current source is controlled as a function of the value of an input control signal and wherein said correction signal acts to modify said control signal to thereby reduce said output voltage.

7. The invention in accordance with claim 4 wherein said correction means includes gating means for selectively passing said gating signals to said rectifiers and wherein said correction signal acts to inhibit the gating means to thereby prevent the passing of said gating signals to said rectifiers, and further includes means to effect a reduction in the output voltage of said direct current voltage source.

8. The invention in accordance with claim 4 in which the means to modify said second signal is an amplifier having a gain of approximately K, wherein:

$$K = \sqrt{L/C}$$

in which,

L is the effective inductance of said load, and

C is the effective commutating capacitance of said inverter.

9. The invention in accordance with claim 4 in which the load is an alternating current motor and in which said limit signal has a value approximately equal to the sum of value of the motor voltage and the first signal multiplied by a constant K, wherein:

$$K = \sqrt{L/C}$$

in which,

L is the line-to-line leakage inductance of the motor, and

C is the effective commutating capacitance of the inverter.

10. A drive system for a polyphase alternating current motor comprising:

(a) a source of variable direct current voltage;

(b) first control means for said source operative to output a first control signal to vary the output of the source in response to a first input control signal;

(c) a controlled current inverter circuit coupled to said source for receiving the direct current voltage and for supplying variable frequency and variable voltage polyphase alternating power to said motor, said circuit comprising a plurality of controlled rectifiers connected in a bridge arrangement and responsive to gating signals applied thereto to control the conduction thereof;

(d) second control means for supplying said gating signals in response to a second input control signal;

(e) means to determine the magnitude of the output voltage of said inverter circuit and to provide a first feedback signal having a value proportional thereto;

(f) means to determine the magnitude of the output current of said inverter circuit and to provide a second feedback signal having a value proportional thereto;

(g) means to adjust the value of said second signal by a constant to provide third signal of adjusted magnitude, said constant having a value determined as a function of the impedance values of a load supplied by said inverter circuit;

(h) means to combine said first and third signals to provide a limit signal;

(i) means to provide a reference signal proportional to a permissible voltage which may be impressed across each of said semiconductor devices;

(j) means to compare said limit signal and said reference signal and to output a correction signal in response to a prescribed relationship therebetween; and, (k) means responsive to said correction signal to override said first control signal to thereby effect a reduction in the output voltage of said direct current source and to inhibit the application of gating signals to said inverter circuit.

11. The invention in accordance with claim 10 wherein said means to adjust the value of said second signal is an amplifier having a gain of K wherein K is approximately equal to $\sqrt{L/C}$ in which L is the effective inductance of the motor and C is the effective capacitance of the inverter.

* * * * *